United States Patent [19]

Halden

[11] Patent Number: 4,616,870

[45] Date of Patent: Oct. 14, 1986

[54] MOBILE DISPLAY SYSTEM

[76] Inventor: Keith W. Halden, Owlwood Farm, Allerton Bywater, Castleford, West Yorks WF10 2AN, England

[21] Appl. No.: 741,157

[22] Filed: Jun. 4, 1985

[51] Int. Cl.$^4$ ............................................... B60R 13/00
[52] U.S. Cl. ........................................ 296/21; 211/48
[58] Field of Search ................ 296/21, 24 R; 211/48, 211/47, 169, 90; 312/118

[56] References Cited

U.S. PATENT DOCUMENTS

| 1,745,713 | 2/1930 | Reed | 211/48 |
| 2,023,866 | 12/1935 | Best | 211/48 |
| 2,289,042 | 7/1942 | Robertson | 211/48 |

Primary Examiner—Robert R. Song
Attorney, Agent, or Firm—Steele, Gould & Fried

[57] ABSTRACT

A mobile display system for carpet samples and the like which includes a vehicle having an interior space defining a mobile showroom for the carpet samples and the like, a framework having at least one elongated support member, secured to the vehicle within the interior space, and a plurality of racks pivotally mounted in a row on the at least one elongated support member and adapted to hold samples of carpet and the like on both sides thereof. The racks are preferably so closely spaced as to tend to randomly engage one another. The carpet samples and the like cushion the engagement to reduce damage to the racks and noise during vehicle movement without damaging the carpet samples and the like. The structure allows very large numbers of samples to be transported and attractively displayed.

16 Claims, 16 Drawing Figures

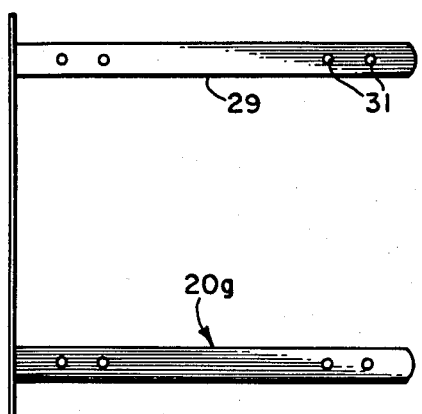
FIG.4g
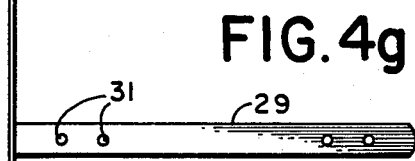
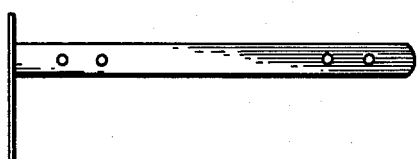
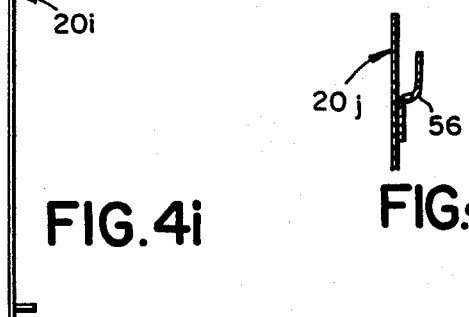
FIG.4i  FIG.4k
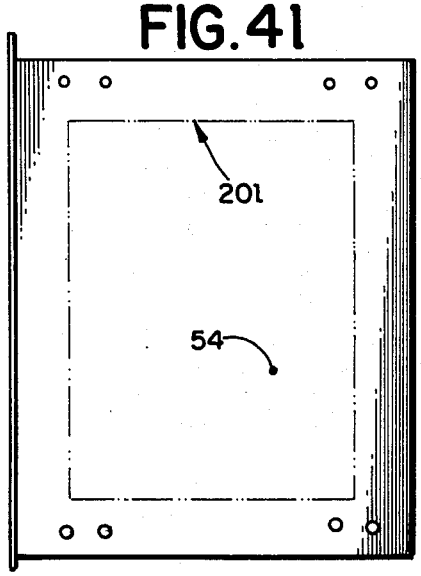
FIG.4l
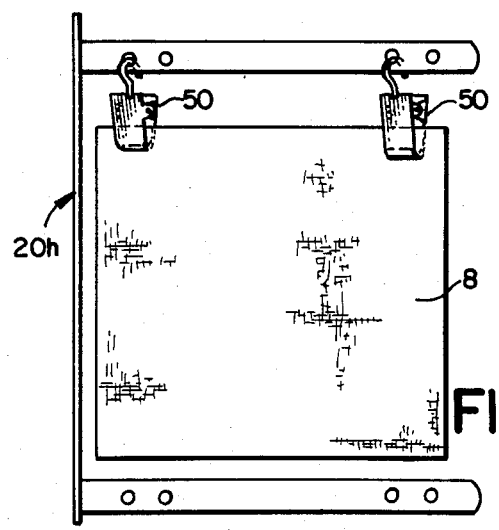
FIG.4h
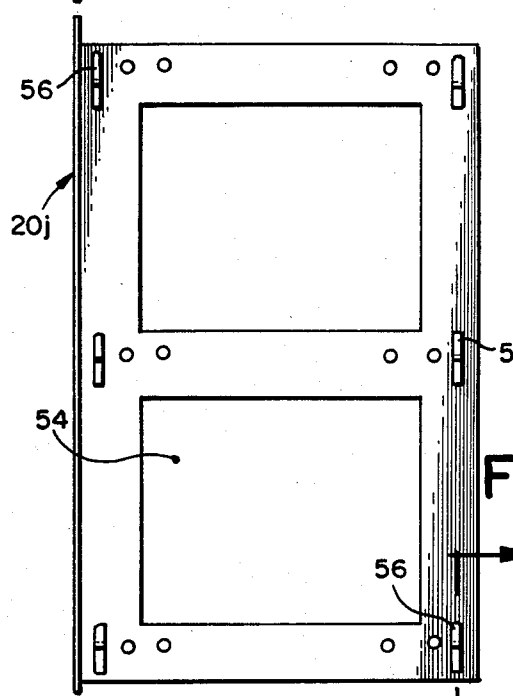
FIG.4j
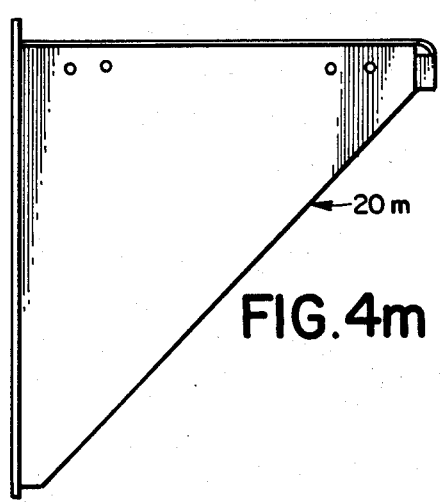
FIG.4m

MOBILE DISPLAY SYSTEM

BACKGROUND OF THE INVENTION

Carpeting is commonly sold from showrooms where samples of the various styles and colors are displayed. This method of sale poses a number of problems for the customers. It is inconvenient for many customers to travel to the showroom. It is often difficult for a customer to decide on a particular style or color in the showroom. The customer often wants to compare a sample to the room color and furniture where the carpet will be laid. It is also often desirable to the customer to compare several samples, one after the other, in the room, to help the customer reach a conclusion as to which looks best. The lighting in the showroom will likely differ from that where the carpet will be used, so that the carpet may not look the same after installation.

No satisfactory solution to these difficulties has been found. It is the practice in the carpet industry to provide samples of carpeting to the customer which may be taken home for comparison, or to have a salesman bring samples to the home. However, a store will usually provide only a few different samples to the customer. Even if they are provided, it is inconvenient to transport a large number back and forth from the showroom. The salesman must bring samples which are either too few in number or too small in size to be of much satisfaction, as transportation of large or numerous samples becomes onerous. It would be desirable to have a vehicle which would easily and efficiently transport large and numerous samples of carpet to a customer's home.

SUMMARY OF THE INVENTION

It is an object of the present invention to provide a vehicle which can conveniently store and display a large number of carpet samples or the like.

It is another object of the present invention to provide a convenient structure for transporting large samples of carpet and the like.

It is still another object of the present invention to provide a mobile display system wherein the samples are readily removed.

It is still another object of the present invention to provide a mobile display system which can be constructed at relatively low cost.

These and other objects are accomplished by a vehicle having an interior space defining a mobile showroom for carpet samples and the like. A framework has at least one elongated support member secured to the vehicle within the interior space. A plurality of racks are pivotally mounted in a row on the at least one elongated support member. The racks are preferably adapted to hold samples and the like on both sides thereof. The racks are generally so closely spaced as to tend to randomly engage one another. The carpet samples and the like cushion the engagement of the racks to reduce damage and noise during vehicle movement. A large number of samples can thereby be transported and displayed.

The racks preferably have pairs of upstanding pins which engage rings or the like affixed to the samples. Alternatively, the racks may be formed of plate-like members with holes to receive hooks affixed to the samples.

In one embodiment, the racks are substantially E-shaped. In another embodiment, the racks are substantially square-C shaped. In yet another embodiment, the racks are substantially triangular in shape. A well-supported rack may have the structure of two substantially triangular portions at least partially sharing a common leg.

BRIEF DESCRIPTION OF THE DRAWINGS

There are shown in the drawings forms which are presently preferred, it being understood, however, that this invention is not limited to the precise arrangements and instrumentalities shown.

FIGS. 4(a)–4(j), 4(l) and 4(m) are diagrammatic side elevations of alternative rack structures according to the invention.

FIG. 4(k) is a section view taken along the line 4K—4K in FIG. 4(j).

DESCRIPTION OF THE PREFERRED EMBODIMENTS

Figure 1:
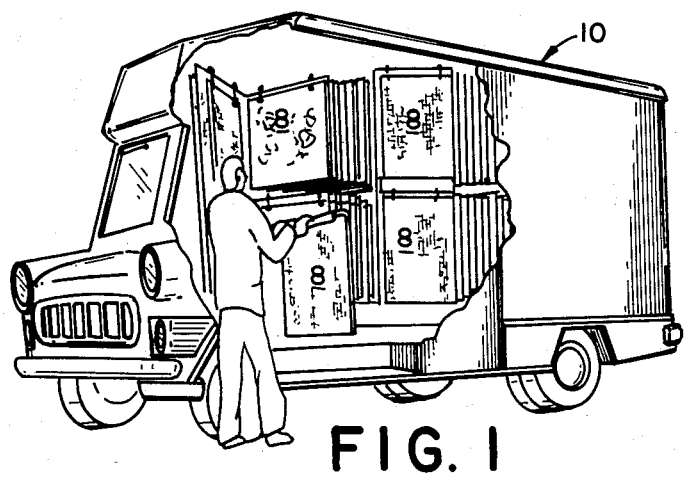
FIG. 1 is a perspective view, partially broken away, of a display vehicle according to the present invention.

Referring now to FIG. 1, a van 10 suitable for use with the invention is shown. The van need not be of any particular style or model, but should have a large space in its rear storage area to provide space for the showroom. The necessary space will vary with the size of the display that is desired, i.e., the number and size of samples which are to be carried. There should be sufficient headroom to allow people to freely walk in the van. This typically would mean a floor to ceiling height of about six and one-half feet. The walls of the van, or the framework supporting the walls, should be sturdy enough to support the substantial weight of the carpet.

Figure 2:
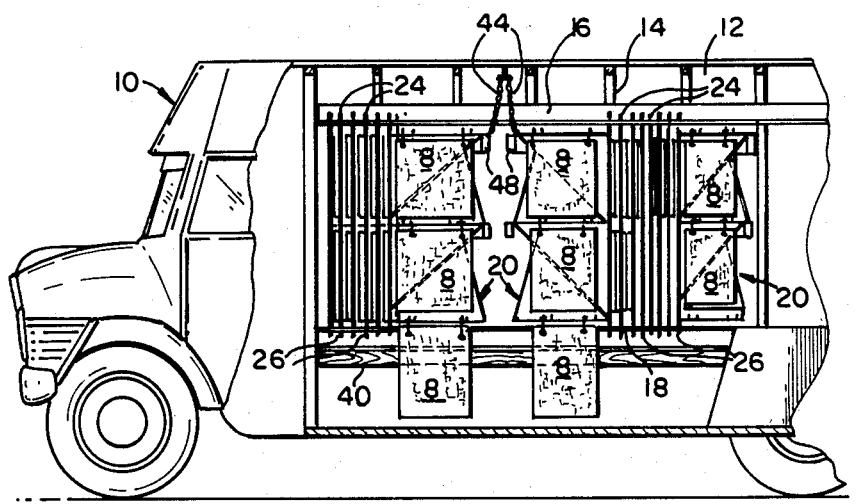
FIG. 2 is a front elevation of the interior wall of a vehicle constructed according to the present invention.
Figure 3:
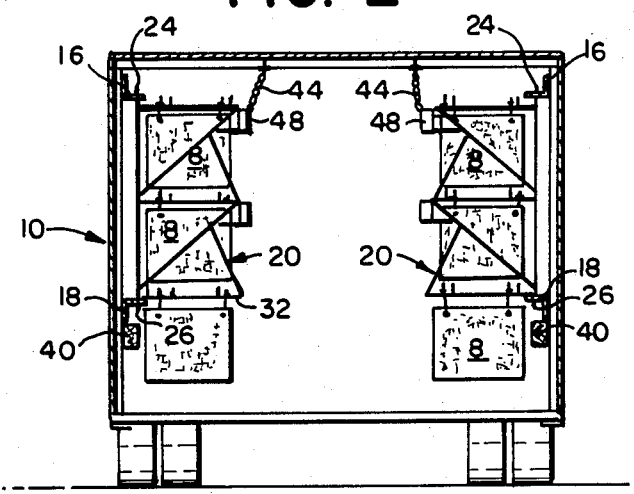
FIG. 3 is an interior cross-sectional view taken from the rear of the vehicle in FIG. 1.

FIGS. 2 and 3 show an interior portion of a van fitted, according to the present invention, as a mobile showroom for a plurality of carpet samples 8. The wall 12 of the van 10 may include box section supports 14. Elongated rack supports 16, 18 are preferably provided as angle irons. A top and bottom support are preferable. The angle iron may be one and one-half inches on each side and one-quarter inch thick. The angle iron is affixed to the wall 12 or the box section supports 14 by suitable means known in the art such as welding, rivets, or screws. The supports are preferably spaced vertically apart 42" but this may vary depending on the size of the racks used. In a van with a floor to ceiling height of 83", the topmost angle iron rack support 16 is preferably spaced approximately 9" from the ceiling while the bottom most angle iron rack support is spaced approximately 30" from the floor.

The rack supports include structure for pivotally engaging racks 20. These can be provided as a series of holes in the angle iron which receive pins from the racks 20. The holes are preferably drilled on approximately one and one-quarter ($1\frac{1}{4}$") inch to two (2") inch centers, and are preferably approximately 17/64" in diameter. The holes are preferably spaced with their centers approximately $\frac{1}{2}$" from the outer edge of the angle iron. The rack engaging structure may alternatively include clasps or the like to pivotally receive the rack members as is known in the art.

The racks 20 preferably include a back pivot member 22 which is a rigid rod or shaft which pivotally engages the elongated rack supports 16, 18 at its distal ends. Engagement is preferably provided by upwardly and downwardly extending pins 24, 26 which are received in the holes in the angle iron. The racks 20 include outwardly extending carpet support members, here arms 28, 30, and 32. These may be supported by reinforcement members 34, 36 which can be seen to form a pair of triangles at least partially sharing a common leg. The reinforcement members 34, 36 provide vertical support and also resistance to twisting and bending. These members serve the additional function of providing a backing surface against which the carpet may rest so as not to tend to push through the racks.

The carpet support members 28, 30, and 32 include carpet engagement means which preferably are upwardly extending pins 38. Eye rings are preferably secured to the carpet sample by bolts or the like such that the eye rings may be slipped over the pins 38 to suspend the carpet samples. Such eye rings typically have threaded shanks for receiving nuts. The carpet samples are preferably held between washers on the shank, locked in place by the nut. The samples may therefore be easily removed by simply raising the carpet sample to slip the eye rings off the pins 38.

The outwardly extending carpet support members are preferably approximately 28" in length when utilized with a van of approximately a 90" width. This leaves a distance of some 30" for an aisle in the middle of the van so that customers may comfortably view the carpets in the van. The pins 38 are preferably approximately 1¼" high. There preferably are four pins to each support arm so that a carpet sample may be suspended from both sides of each arm. On a 28" arm, the pins would be preferably located approximately 3", 6", 21", and 24" from the outer end of each arm. The pivotal support member 22 is preferably approximately 44" in length. The racks are preferably made of ¼" bars of a suitable materials such as steel or a strong plastic.

Figure 4A:
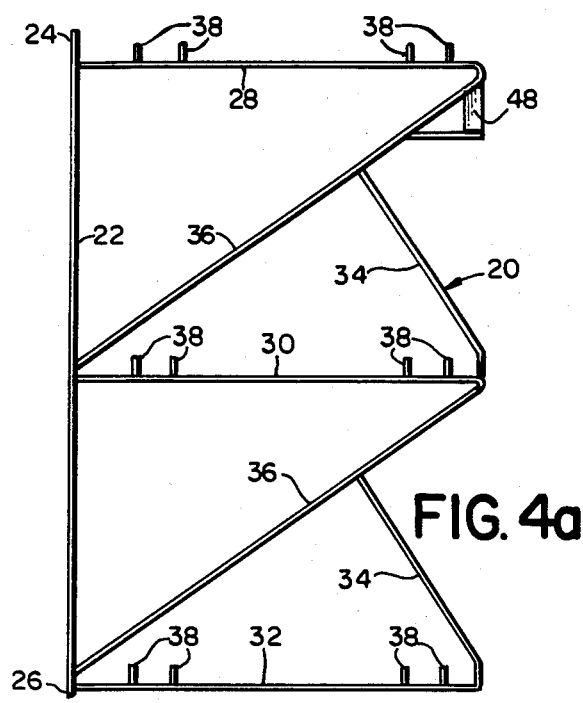
Figure 4B:
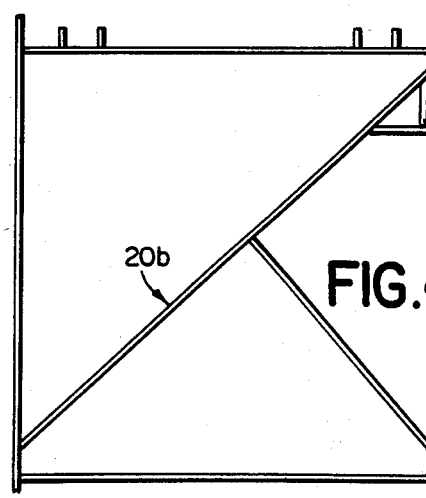
Figure 4C:
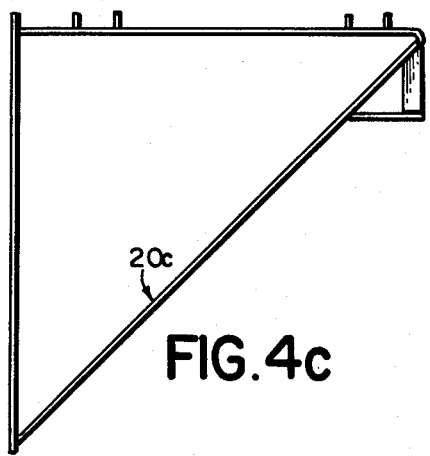
Figure 4D:
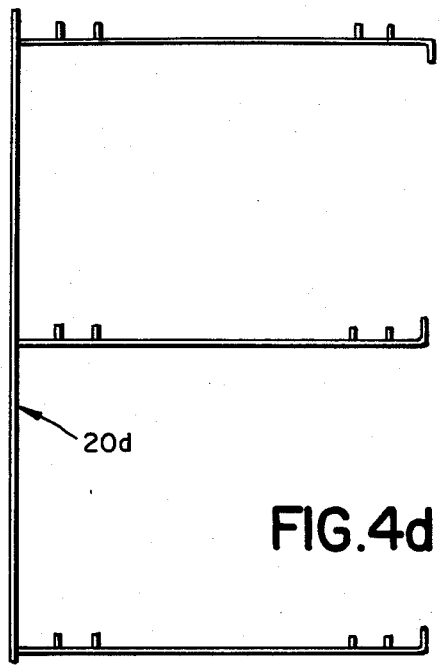
Figure 4E:
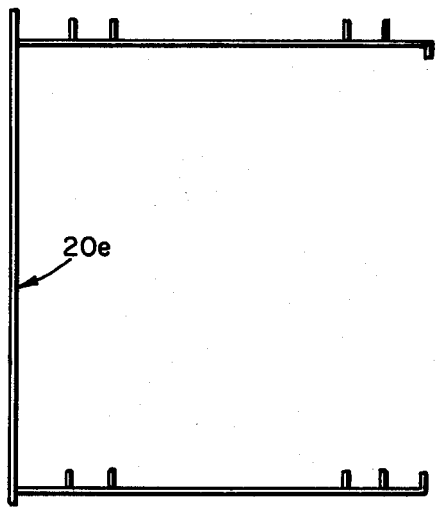
Figure 4F:
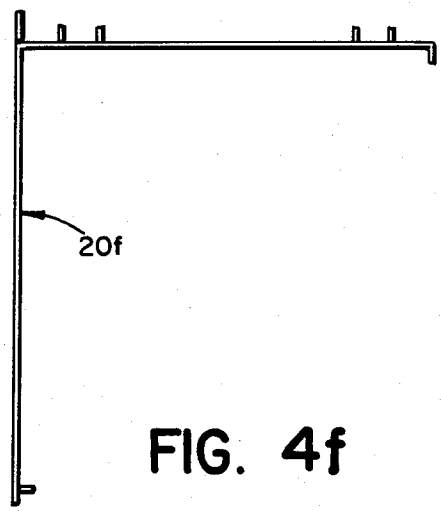

The racks 20 can be formed in a variety of shapes and styles. That shown in FIG. 4(a) is basically for smaller carpet samples, approximately 27" by 18". The rack 20b shown in FIG. 4(b) is for larger, square carpet samples approximately 27" by 27". The rack 20c shown in FIG. 4(c) is for larger samples typically 27" by 54". Racks 20d, 20e and 20f are basic skeletal designs and are shown in FIGS. 4(d), 4(e) and 4(f). Racks 20a, 20b, and 20c are presently preferred rack designs. The carpet support members in those racks are braced by cross members to provide sturdy support for the carpet samples. While particular rack designs in terms of the placement of the outwardly extending arms and supporting bars have been shown, it should be understood that different designs are possible without departing from the spirit of the invention, and any particular depictions should not be taken to limit the invention to those precise arrangments shown.

In the alternative racks 20g, 20h and 20i structure shown in FIGS. 4(g), 4(h) and 4(i), the carpet support members 29 are formed from a plate material such as a thick sheet metal or plate with punched or drilled holes 31 drilled to receive hooks or clips 50 which are affixed to the carpet samples 8. The hooks or clips are preferably readily detachable from the samples and accordingly may have a design substantially similar to suspender clips. Alternatively, the hooks or clips may be permanently affixed to the samples by means known in the art such as bolting. The sheet metal or plate is preferably approximately ⅛" thick.

Another set of alternative racks 20j, 20l and 20m are structure is shown in FIGS. 4(j), 4(l) and 4(m) wherein the racks are formed from a sheet metal, preferably 22 gauge. The racks may be formed from either a single solid sheet of metal or have open interior sections 54 to reduce the overall weight of the racks. In this embodiment, it may be desirable to affix hooks 56 to the sheet metal which would receive eye rings affixed to the carpet samples. Alternatively, holes could be punched in the sheet metal to receive hooks affixed to the carpet samples.

With further reference to FIGS. 1–3, carpet samples hanging from the bottom most member 32 will tend to bunch on the angle iron 18 when the racks 20 are pivoted toward the elongated rack supports. It is therefore preferable to provide a bumper 40 which prevents the carpeting from being damaged by rubbing against the iron. The bumper 40 in the present example is conveniently provided as a 3½" by 1½" inch timber of appropriate length affixed to the wall of the van immediately below the angle iron 18.

The pin and eye ring system is particularly useful as it enables tiering of the carpet samples and prevents the carpet samples from sliding off the racks during movement. In as much as the racks themselves tend to move about randomly during transport, it is desirable to provide means for restraining the movement of the racks during transport. These can be provided as chains 44 which are affixed to the ceiling or wall of the van and which detachably engage onto the racks to pull them tightly against the wall. Even with the restraint means there is some jostling that will occur between the racks, because they are closely spaced. However, because the carpeting faces each side of the racks they are shielded form damage which otherwise occur during transport. It may also be desirable to provide plates 48 with indicia for locating the proper rack for a particular sample, which would bear a like marking. The indicia is preferably a numerical system, but could alternatively indicate color, etc.

The vehicle according the the present invention provides a convenient showroom for carpeting and the like which is driven to the customer's home. The back of the van may be outfitted with a convenient access door so that customers may actually walk into the van and view the samples on the racks. The customer may choose several samples and easily remove them from the racks to view in the room for which the carpet is intended. The indicia allows easy organization of the large numbers of samples which may be transported in the vehicle.

The rack system in its various embodiments may be used in environments other than a vehicle, that is, static displays. In such a case, a wall or other framework would be necessary for mounting the system. Bumpers would still be useful to prevent damage to the samples during use, and the chains would be useful in a security sense, to prevent unauthorized browsing or access to numbers of expensive or exclusive samples.

While the foregoing description has been directed to a vehicle for transporting carpet sample, it is apparent that the vehicle would have utility for other similar articles such as ceramic tiles, linoleum, or diverse planar materials such as curtains and wallpaper backed with a suitable stiff backing. Also, this invention may be embodied in other specific forms without departing from the spirit or essential attributes thereof, and accordingly, reference should be made to the appended claims, rather than to the foregoing specification, as indicating the scope of the invention.

I claim:

1. A mobile display system for carpet samples and the like, comprising:

a vehicle having an interior space defining a mobile showroom for carpet samples and the like;

a framework having at least one elongated support member secured to the vehicle within the interior space;

a plurality of racks pivotally mounted in a row on the at least one elongated rack support member and adapted to hold samples of carpet and the like on both sides thereof, the racks being so closely spaced as to tend to randomly engage one another, the carpet samples and the like cushioning the engagement to reduce damage to the racks and noise during vehicle movement without damaging the carpet samples and the like; and, rack restraining means affixed to the vehicle and adapted to be detachably engaged to the racks to prevent swinging during transport, whereby very large numbers of samples may be transported and displayed.

2. The mobile display system of claim 1, wherein the racks further comprise a plurality of upstanding pins with upwardly directed distal ends adapted to receive engagement structure affixed to the carpet samples or the like.

3. The mobile display system of claim 2, wherein the engagement structure comprises ring means.

4. The mobile display system of claim 1, wherein said racks are made of rigid rods.

5. The mobile display system of claim 4, wherein said racks have a vertical engagement member pivotally engaged to the at least one elongated rack support so as to pivot in the horizontal plane, and carpet support arms extending substantially perpendicularly outwardly from the pivotal engagement member.

6. The mobile display system of claim 5, wherein the racks further comprise reinforcement members.

7. The mobile display system of claim 6, wherein the reinforcement members form substantially triangular shapes between a pair of carpet support arms and the pivotal engagement member, said substantially triangular shapes sharing at least a portion of a common leg.

8. The mobile display system of claim 1, wherein the racks are formed of sheet metal.

9. The mobile display system of claim 8, wherein the racks include holes adapted to receive hooks affixed to carpet samples and the like.

10. The mobile display system of claim 9, wherein the hooks are affixed to the samples by detachable means substantially resembling suspender clips.

11. The mobile display system of claim 8, wherein hook members are affixed to the sheet metal and adapted to receive rings means affixed to the carpet samples and the like.

12. The mobile display system of claim 8, wherein the racks are composed of solid sheets of metal.

13. The mobile display system of claim 8, wherein said sheet metal or plate is provided in the form of strips forming structural members.

14. The mobile display system of claim 1, wherein said racks bear indicia matching indicia on the carpet samples and the like whereby particular samples may be returned to particular racks.

15. The mobile display system of claim 1, wherein said at least one elongated rack support further comprises a series of apertures adapted to receive pins or the like extending from the racks so as to pivotally engage the racks to the rack supports.

16. The mobile display system of claim 1, further comprising an elongated bumper affixed to the vehicle immediately below the bottom most elongated support and extending outwardly beyond the outer edge of said elongated support to prevent abrasion of the carpet samples and the like against said elongated support.

* * * * *